May 18, 1954 — A. L. WILLIAMS — 2,678,628
SHIPPING CONTAINER FOR ANIMALS
Filed March 10, 1951
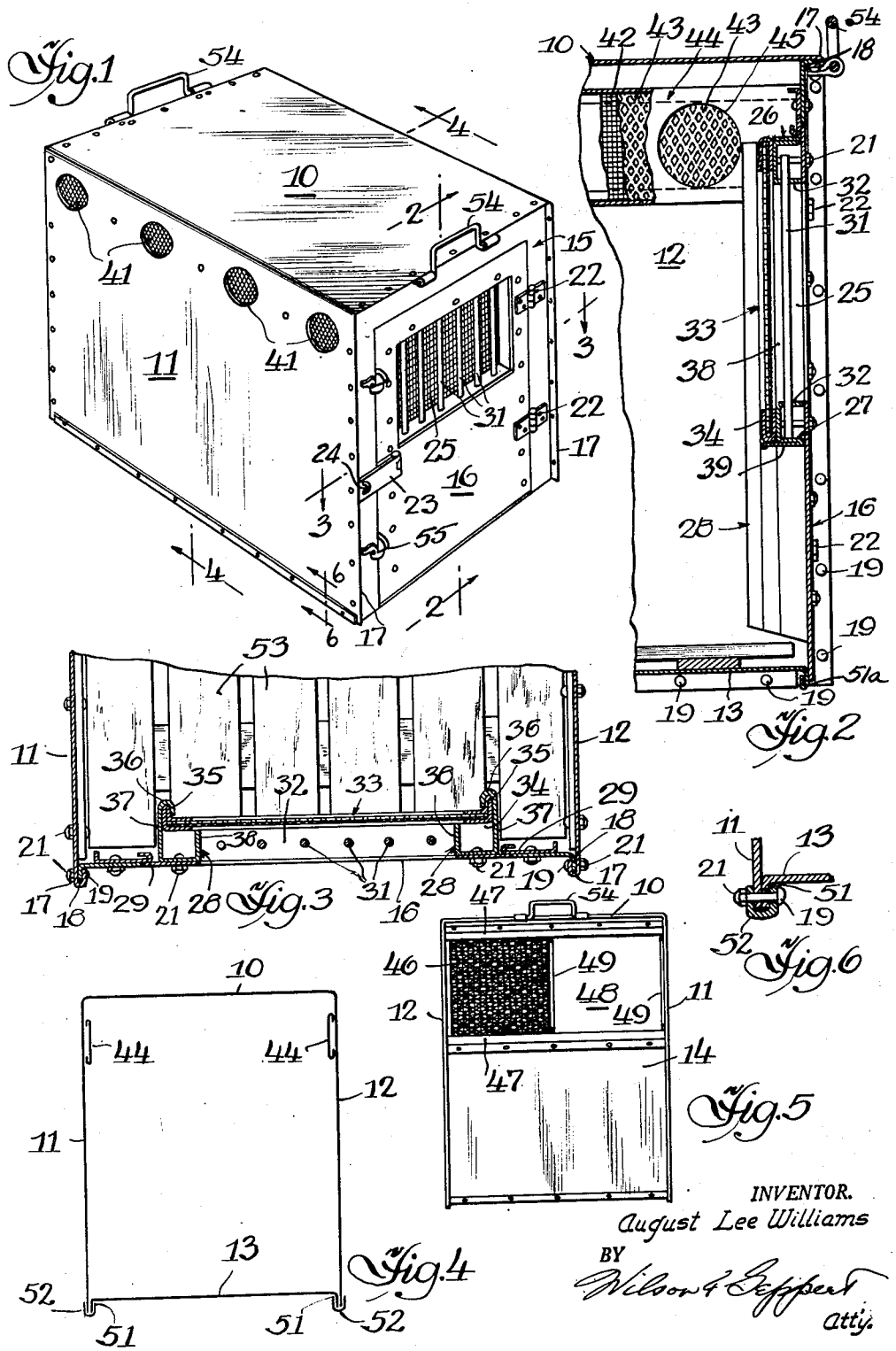
INVENTOR.
August Lee Williams
BY
Wilson & Geppert
atty.

Patented May 18, 1954

2,678,628

UNITED STATES PATENT OFFICE 2,678,628

SHIPPING CONTAINER FOR ANIMALS

August Lee Williams, Chicago, Ill.

Application March 10, 1951, Serial No. 214,927

2 Claims. (Cl. 119—19)

The present invention relates to shipping crates or containers for the enclosure and transportation of dogs, cats and other smaller animals.

Among the objects of the present invention is the provision of a novel shipping crate or container so constructed and arranged as to give optimum protection to the animal confined therein against bodily injury and the attacks of insects and other pests during shipment, and also maintain the animal secure from molestation or the attention of unauthorized persons. The novel crate or container is so designed and constructed as to also provide a positive protection against the escape of the animal and its possible attack upon anyone or other damage.

The present invention further comprehends a novel construction of container or crate for temporarily housing an animal such as during shipment or transportation from place to place, and permitting such animal maximum comfort during the period of confinement. This container is made of rigid, metal construction throughout, yet is sufficiently light to enable it to be carried about and readily stacked.

Another important object is the provision of a novel animal crate or container constructed primarily of sheet metal with the sides, top, bottom and end walls all joined or connected in such manner that the overlapping and joined edges thereof extend to the exterior of the crate or container whereby the entire interior thereof is devoid of all projections or edges whereby the animal is protected against injury while confined.

A further object of the present invention is the provision of a novel crate or container having its base or bottom surface elevated from the ground or supporting surface upon which it is placed. This base or bottom surface is flat and uninterrupted and formed flush with the lower edge of the large access opening, whereby the base of the crate is devoid of all projections or surfaces that would prevent ready and thorough cleaning and brushing of the base and interior of the crate from the exterior. By reason of the novel construction of the crate, complete sanitation is readily maintained.

The invention of this application is an improvement over that disclosed in my Patent No. 2,534,492.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in perspective of the novel animal shipping crate or container.

Fig. 2 is an enlarged fragmentary view in vertical cross section taken in a plane represented by the line 2—2 of Fig. 1.

Fig. 3 is an enlarged fragmentary view in horizontal cross section taken in a plane represented by the line 3—3 of Fig. 1.

Fig. 4 is a diagrammatic or schematic view taken approximately on the line 4—4 of Fig. 1.

Fig. 5 is a view in rear elevation of the novel shipping crate or container.

Fig. 6 is a fragmentary enlarged view in vertical cross section through the rear panel and base of the crate the view being taken on the line 6—6 of Fig. 1.

Referring more particularly to the disclosure in the drawing and to the novel embodiment therein selected to illustrate the present invention, the novel animal crate or container for confining or housing an animal such as a dog or cat during shipment with optimum comfort and safety, comprises a top wall 10, side walls 11 and 12, a bottom wall or base 13, a rear or end wall 14 and a front or end wall 15 provided with a door or closure 16 for access to or from the crate or container.

The top wall 10 and side walls 11 and 12 are preferably formed of an integral sheet of a relatively light weight but strong and rigid, non-corrosive metal such as aluminum, magnesium or an alloy of one of these metals. The rear or end wall 14 and the front or end wall 15 are of similar metal and inset with the protruding ends of the top wall 10 and the side walls 11 and 12 providing a turned edge in the form of a U-shaped portion 17 comprising an outwardly extending and inwardly turned external U-shaped flange adapted to conformably receive an outwardly projecting peripheral flange 18 on the top and sides of the end walls to provide an external and overlapping seam. This seam is tightly and rigidly clamped together by transverse bolts 19 and nuts 21 (see Fig. 3). Although Figs. 1, 2 and 3 disclose in detail the assembly of the front or end wall 15, the rear or end wall 14 is similarly inset.

The door or closure 16 in the front wall 15 is also constructed of sheet metal similar to that of the remainder of the crate or container. It is swingably or pivotally mounted upon a plurality of spaced hinges 22 which are affixed to the adjacent front wall 15 and the door or closure 16 by bolts, rivets or other rigid securing means. A hinged hasp 23 is secured to the door or closure 16 and a staple 24 is rigidly secured to the wall 15 and adapted to receive a padlock (not shown), whereby to provide a convenient and secure way of locking or retaining the door or closure against unauthorized opening. If desired, the staple and hasp may be mounted in reverse to that shown. In the disclosed form of hinged hasp and staple, when the door is closed and locked by a padlock, the bolts or securing means for attaching both the hasp and the staple securely to their supporting surfaces on the front wall and on the door or closure, are covered and protected by the hasp against tampering.

To provide for adequate ventilation and yet to protect the privacy of the confined animal, the upper portion of the door or closure is provided with a rectangular aperture or opening 25 having its margins reinforced by sheet metal channel members bolted, riveted, welded or otherwise rigidly affixed to the metal door or closure about the opening. The upper channel member 26 and the lower channel member 27 open outwardly, and the side channel or guide members 28 open inwardly as shown in Figs. 2 and 3, and all are rigidly secured to the interior of the frame of the door or closure adjacent the marginal edges thereof by bolts 19 and cap nuts 21.

When the door is closed its marginal edge abuts the inwardly projected or extended rounded edge of channel members 29 which frame the door opening in the front or end wall 15 and limit the inward movement of the door whereby a tight fit is assured. These channels are connected to the front wall by bolts 19 and cap nuts 21, and the rounded edge protects the animal against scratching or cutting both on entering and on leaving the crate.

The opening 25 is protected by a plurality of rigid metal bars 31 arranged in parallel spaced relation across the opening or aperture 25, with the ends of these bars received in openings in the side flanges 32 of the channel members 26 and 27. The length of these bars is preferably such that when they are inserted into the openings in the flanges 32 in the position shown in Fig. 2, and the upper and lower channel members 26 and 27, respectively, are secured to the frame of the door about the opening 25, these bars are firmly anchored in position.

A removable screen 33 is slidably mounted in the door to the rear of the bars. This screen is provided with an encompassing frame 34 having a return bend 35 adapted to be conformably received in the curved or bent end 36 of the outer flange 37 of the side channel members 28, and with the front face of the screen frame 34 abutting and guided by the inner flange 38 of the side channel members. To provide a stop limiting the downward movement of the screen, the lower channel member 27 is provided with a rearwardly projecting flange 39 extending beyond the remainder of this channel member to form an abutment or shelf for the lower edge of the screen.

As shown in Figs. 2 and 3, the screen 33 is a compound one including preferably an outer fine wire mesh and an inner relatively coarse wire mesh. By having this screen at the interior of the opening or aperture 25, it will be readily appreciated that it cannot be reached or removed when the door is in closed position but when the door is opened the screen may be raised or removed by lifting or sliding it upwardly in the channels or guide members 28.

In order to afford the animal adequate ventilation, the side walls 11 and 12 are provided with a plurality of spaced apertures or openings 41 adapted to be covered by a fine wire mesh screening 42 such as a relatively fine fly screen to keep out insects and the like, and a relatively coarse or heavy mesh screening 43 to prevent injury to the fine mesh screening. As there is more likelihood of damage to the fine mesh screening 42 due to the animal scratching than from external sources, the coarse and heavier screening 43 is preferably placed toward the interior of the crate and this compound screen composed of the two layers is mounted in a screen carrier 44 having apertures or openings 45 adapted to register or align with the apertures or openings 41 in the side walls of the crate. This screen carrier is preferably of sheet metal having its longitudinal flanges turned inwardly to form a channel for receiving and retaining the edges of the screen in anchored position.

Additional ventilation for the confined animal is provided at the rear of the crate by means of a perforated wire mesh or screen 46 mounted or disposed adjacent the top of the rear wall or panel 14 at one corner thereof. The edges of the screen are anchored in U-shaped channel members 47, the upper and lower ones of which being also adapted to receive the upper and lower edges of a slidable closure plate 48 adapted to be readily moved over the screen when desired. To facilitate movement of this closure plate to open, partially open or closed position, the opposite end of this plate is formed or provided with a flange or hand grip 49.

The bottom or base 13 is provided with downturned edges or depending flanges 51 adapted to be joined to the lower edges of the side and rear walls or panels by a substantially U-shaped supporting member 52, as more clearly shown in Figs. 3 and 6. Bolts 19 and cap nuts 21 anchor these parts together. At the forward end of the bottom or base 13, the down-turned edge or flange 51a provides an abutment against which the lower or depending peripheral edge of the door 16 abuts (Fig. 2) when the door is closed. By reason of this construction and arrangement, it will be apparent that the bottom or base 13 of the crate is at all times elevated from the ground, floor or other supporting surface upon which the crate is placed.

A slat floor 53 is preferably provided on the base or bottom 13 of the crate to protect the confined animal from any accumulation on this base and to support the animal thereabove. This slat floor can be readily inserted into the crate or it may be quickly removed by tilting it and withdrawing it through the door opening. Then the base or bottom can be thoroughly cleaned from the exterior through the door opening as there are no corners, depressions or other places where dirt may accumulate and be difficult to remove and the base floor is uninterrupted through the door opening.

Throughout the interior of the crate there are no sharp edges or corners which might injure a confined animal. For example, the inner or exposed surface of the end 36 of the side channels 28 and the inner or exposed ends of the channel members 29 are so curved, rounded or contoured that injury cannot result to the animal when coming in contact therewith. With respect to the bolts 19 or nuts anchoring the screens in the side walls 11 and 12 of the crate, precaution has been taken that such bolts or nuts if they project into the interior of the crate are either countersunk or rounded in a manner as to present no sharp edges. To permit a plurality of these shipping crates or containers to be closely stacked and in a compact manner, exposed screw or bolt heads in the top wall 10 as well as in the side walls 11 and 12 are countersunk.

By making the end walls 14 and 15 inset from the ends of the crate assembly, there is little or no likelihood of damage thereto or to the closure or screens in these end walls, and the confined animal is assured of air and ventilation regardless of how closely the crate or container may be surrounded by walls or other objects.

Handles 54 at the opposite ends of the shipping crate or container permit the same to be easily carried about or transported, the entire crate assembly being relatively light in weight but extremely rigid and capable of sustaining heavy loads. Furthermore, if a wall or part of the crate or container should be bent or damaged, it may be easily and readily repaired and, if necessary, the damaged part or parts may be quickly removed for repair and reassembled. Additional latching means for the door or closure 16 such as ordinary window catches 55 may be provided in addition to the hinged hasp 23.

Having thus disclosed the invention, I claim:

1. A crate for confining and shipping an animal, comprising a container formed of sheet metal and having a top, side walls, end walls and an uninterrupted and unobstructed flat base with the top and side walls consisting of an integral sheet of metal having its edges at the opposite ends extending beyond the end walls whereby the end walls are inset from the opposite ends of the crate, fastening means for joining the base and end walls to the top and side walls including an outwardly extending and inwardly turned external U-shaped flange on the edges of the integral top and side walls and an outwardly projecting peripheral flange on the end walls conformably received in the U-shaped flanges whereby the interior of the container is devoid of any fastening means and internal projections upon which the animal may be injured, a flange about the edges of the base of the container depending therefrom and positioning and maintaining the base above the surface upon which the container is placed whereby to space the base from the supporting surface, and a metal door pivotally mounted in an end wall and provided with a depending peripheral edge projecting below the uninterrupted top surface of the base and abutting a flanged edge of the base and extending to adjacent the supporting surface when the door is closed, whereby to expose this edge of the base and the uninterrupted and unobstructed top surface of the base to give complete access to this top surface when the door is open and allow for most effective cleaning of the base and interior of the crate.

2. A crate for confining and shipping an animal, comprising a rectangular container of sheet metal and having a top and side walls consisting of an integral sheet of pliable metal providing a flat and uninterrupted top surface and vertical side walls, end walls and a flat and unobstructed base, the opposite end walls being inset from the opposite ends of the top and side walls and provided with an outwardly projecting flange joined by an external and encompassing seam to the ends of the top and side walls whereby they are connected at the exterior of the crate and the interior thereof is devoid of any connecting means, a downwardly projecting flange on the periphery of the base for connection to the lower depending edges of the side walls, a separate, substantially U-shaped supporting member adapted to receive therein the downwardly projecting flange on the base and the depending lower edge of the side wall at the opposite sides of the crate, means for rigidly joining each supporting member to the downwardly projecting flange and the depending lower edge of a side wall whereby the supporting members support the crate upon a supporting surface with the base of the crate in elevated position above this supporting surface, and a large hinged closure for an access opening in one end wall and of such length as to extend substantially below the upper surface of the base to permit easy entry and removal of the animal through the opening and to facilitate cleaning of the base and interior of the crate.

References Cited in the file of this patent

UNITED STATES PATENTS

| Number | Name | Date |
|---|---|---|
| 994,128 | Corliss | June 6, 1911 |
| 1,047,561 | Petersen | Dec. 17, 1912 |
| 1,048,611 | Warnick et al. | Dec. 31, 1912 |
| 1,145,646 | Wright | July 6, 1915 |
| 1,146,217 | Vaughan | July 13, 1915 |
| 1,449,428 | McGaffee | Mar. 27, 1923 |
| 2,092,155 | Hackett | Sept. 7, 1937 |
| 2,529,893 | Albert | Nov. 14, 1950 |
| 2,534,492 | Williams | Dec. 19, 1950 |